Feb. 16, 1932.    G. E. NERNEY    1,845,807
TEMPLE BAR CONSTRUCTION
Filed Nov. 30, 1927
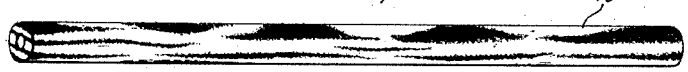
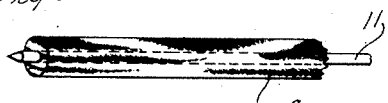
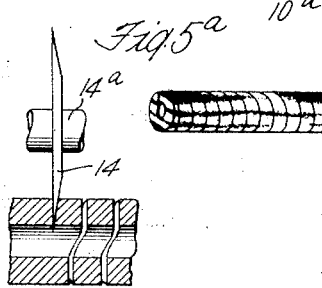
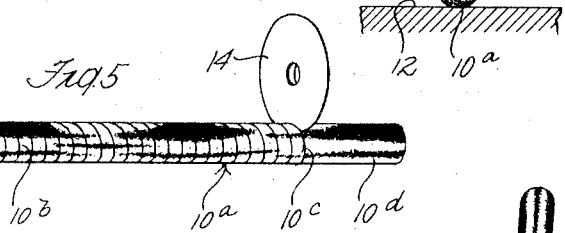
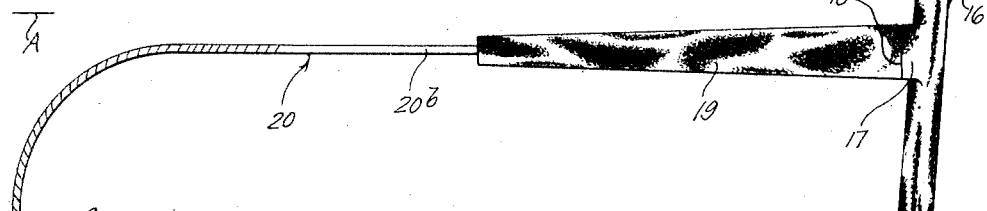
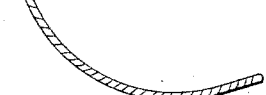
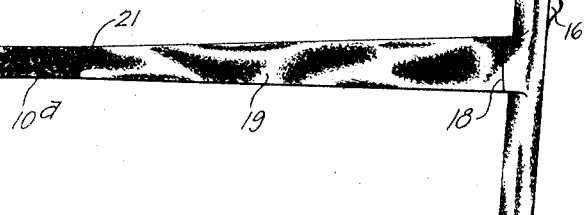
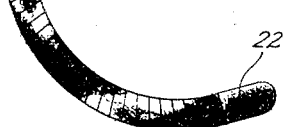
INVENTOR
George E. Nerney
BY
Robert L. Blair ATTORNEY Patented Feb. 16, 1932

1,845,807

UNITED STATES PATENT OFFICE

GEORGE E. NERNEY, OF ATTLEBORO, MASSACHUSETTS, ASSIGNOR TO BAY STATE OPTICAL COMPANY, A CORPORATION OF MAINE

TEMPLE BAR CONSTRUCTION

Application filed November 30, 1927. Serial No. 236,707.

This invention relates to eyeglass temple bar construction and more particularly to the construction of temple bars embodying non-metallic material.

One of the objects of the invention is to provide an improved construction in celluloid or "zylonite" or other non-metallic temple bars having a spiral rear end portion or "cable tip". Another object is to provide a temple bar of the above nature having variegated coloring and in which the different portions of the temple bar harmonize in appearance. Another object is to provide a practical art of making temple bars of the above nature and one which may be carried on rapidly and with inexpensive apparatus. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claim.

In the accompanying drawings in which is shown one of the various possible embodiments of the mechanical features of this invention, Figure 1 is a perspective view of a temple bar member at an early stage in its process of manufacture;

Figure 2 is a perspective view showing the temple bar member at a later stage;

Figure 3 is a perspective view illustrating one step of the process of manufacture;

Figure 4 is a diagrammatic view showing a further step in the process;

Figure 5 is a diagrammatic perspective view showing the cutting of the zylonite;

Figure 5a shows diagrammatically the cutting of the zylonite and a form of cutting tool preferably employed;

Figure 6 is a side elevation of an eyeglass frame and partially completed temple bar, and Figure 7 is a side elevation of the completed frame and completed temple bar.

Similar reference characters refer to similar parts throughout the several views of the drawings.

Referring now to Figure 1 of the drawings, there is shown a bar or rod 10 of celluloid or "zylonite" which is rectangular or substantially square in cross-section. This bar 10 is cut from a sheet of zylonite which is built up of layers of different colors, generally two colors such as a dark and light shade of brown or amber. These sheets of zylonite built up of layers of different colors and thus giving the variegated coloring or "streaked" effect indicated by the shade lines in Figure 1, produce an appearance which is very desirable in eyeglass frames. The colors blend and flow gradually into one another producing a very attractive appearance, particularly when the zylonite is viewed flatwise of the layers from which it is built up. This appearance is indicated in the drawings on the top surface of the bar 10. It is to be understood that the term "celluloid" or the term "zylonite" as employed herein is to be interpreted broadly to comprehend any non-metallic materials having properties similar to those of celluloid and employed in the manufacture of eyeglass frames or parts therefor.

Having produced the bar 10 from a sheet of zylonite as above described, I then reduce this rectangular bar to a circular cross-section as shown in Figure 2. This may be accomplished by any suitable means, for example by turning the bar in a lathe.

In the solid bar of zylonite of circular cross-section is now made an axial passage to form therefrom a tube. The tubular member 10a is shown in Figure 2. The axial passage may be formed in any suitable manner, but preferably I employ an apparatus such as that shown in the co-pending application of Wilbur H. Siddall, filed November 25, 1927, Serial No. 235,724. As described in the said co-pending application, I soften the solid bar preferably by means of heat, then chill the outer surface portions of the bar and thereupon force axially through the bar a wire or rod as shown at 11 in Figure 3. The chilling of the outer surface portions of the circular rod hardens these portions, as is described in the co-pending application mentioned, and these hardened outer portions guide the rod 11 axially through the softened interior of the rod in a true axial path.

When the rod has been pierced in this fashion by the metal rod 11, the metal wire or rod 11 is firmly held within the zylonite when the latter cools. In order to remove the wire 11 I preferably employ a means such as that illustrated in Figure 4. The zylonite tube 10a, with the metal wire or rod 11 therein, is placed upon a level surface 12 and rolled back and forth by means of a flat member 13 bearing down and tending to compress the zylonite. After rolling, as illustrated in Figure 4, the wire or rod 11 becomes loosened and may be drawn out of the zylonite, leaving a tubular member 10a, as shown in Figure 2.

As illustrated in Figure 5, I now cut through the walls of the zylonite tube 10a in spiral fashion, preferably by means of a rotating saw or knife such as illustrated at 14. There is thus formed from the tube 10a a flexible spiral cable 10b. Preferably the tube 10a is cut in spiral fashion throughout the major portion of its length, for example, to the point 10c, leaving a stiff uncut portion 10d.

In cutting the tube of zylonite I employ a cutting tool which is of circular shape, as shown in Figure 5, and the edge of which is beveled on one side only, as shown in Figure 5a. This cutting tool 14 is fixed upon a shaft 14a which is mounted to rotate freely and is not driven. The zylonite tube is gripped at the left-hand end, as viewed in Figure 5a, which is the end toward which the flat side of the cutter faces. The cutter and the zylonite tube are moved together until the cutter penetrates the wall of the tube. Thereupon the tube is rotated by rotating the gripping means at the left-hand end thereof, as viewed in Figure 5a, and the zylonite tube is fed lengthwise past the cutter in the direction indicated by the arrow A in Figure 5a. Instead of axially feeding the zylonite tube, I may axially feed the cutter 14 in the opposite direction or the relative movement may be accomplished by a combined movement of the tube toward the right and the cutter toward the left, as viewed in Figure 5a. I have discovered that this form of cutter having an edge beveled on one side only and operating upon the zylonite with the beveled side facing toward the portion which has been cut, achieves distinct practical advantages. As the zylonite is rotated and fed relative to the cutter, the cutter rotates without requiring to be driven by a separate drive. This cutter cuts through the walls of the zylonite in a much easier and cleaner fashion than does the usual cutting edge having a double bevel. The straight side of the cutter cuts straight through the tube without jamming and attempting to compress the zylonite, and the yielding coils on the beveled side of the cutter are pushed away by the bevel as they are cut, resulting in a smooth even wall being cut on this side also. Thus the cutting is accomplished with a minimum expenditure of power, the resulting cut is smooth and regular and the zylonite coils are not injured.

Referring now to Figure 6, there is shown an eyeglass frame comprising rims 15, a bridge 16 and end pieces 17 provided for attachment of the temple bars. This frame is preferably made of the same material as the tube 10a hereinbefore described, that is, it is formed from zylonite built up in layers of different colors and has the desirable variegated coloring effect. As shown in Figure 6, the frame is formed from the zylonite in such manner that the layers of different colors are viewed flatwise when looking at the frame from the front.

Still referring to Figure 6, there is shown connected to the frame at 18 a temple bar member 19 which is also made of the zylonite built up in layers of different colors. This member 19 is preferably made by cutting from a sheet of the zylonite a rod similar to the rod 10 and thereafter reducing this rod to the shape shown in Figure 6. The member 19 is preferably so arranged that when viewed from the side, as viewed in Figure 6, the layers of different colors are viewed flatwise.

Projecting rearwardly from the temple bar member 19 is a metal extension or core 20. This metal core has preferably an end portion 20a formed of coiled wire and therefore flexible, and a forward portion 20b which is relatively stiff. However, the construction and also the shape of this metal core 20 are unimportant as relating to the broader features of this invention. If desired, the core may be substantially inflexible throughout or not self-conforming, and may be instead bendable so that it may be bent conveniently to adjust the curvature of the rear end portion of the temple bar. The core 20 projects into the temple bar member 19 to any desired distance and is firmly anchored therein, projecting rearwardly therefrom as shown in Figure 6.

Having provided the temple bar member 19, and the projecting core 20 as shown in Figure 6, the spirally cut tube 10a is now slipped over the core 20 and secured in place thereon. In Figure 7 the temple bar is shown in completed form. Preferably the uncut portion 10d of the tube abuts the rear end of the member 19 as at 21. On the extreme rear end of the core 20 is secured a zylonite cap 22 against which the rear end of the zylonite cable abuts. This member 22 is shown herein as a separate part but, if desired, it may comprise an uncut end portion of the tube 10a which is molded over the end of the core 20.

The zylonite tube 10a is placed upon the core 20 preferably in such position that, when the temple bar is viewed from the side as in Figure 7, the zylonite layers of which the tube is built are viewed flatwise. The appearance is indicated by the shading in Figure 7. The rear cable portion of the temple bar thus harmonizes in appearance with the forward portion 19. The temple bar has the same appearance in coloring throughout its length, a result which is highly desirable. It will be seen that the process is capable of being carried on rapidly and at low cost, and the article produced is strong and rugged throughout.

As many possible embodiments may be made of the mechanical features of the above invention and as the art herein described might be varied in various parts all without departing from the scope of the invention, it is to be understood that all matter hereinabove set forth or shown in the accompanying drawings is to be interpreted as illustrative and not in a limiting sense.

I claim:

The herein described art of making eyeglass temple bars which consists in cutting a rod out of a sheet of zylonite, forcing a metal wire axially through said rod, rolling said rod under pressure to loosen said wire therein, removing said wire, thereby forming a tube of said rod, and thereafter placing said tube over a metal core.

In testimony whereof, I have signed my name to this specification this 19th day of November, 1927.

GEORGE E. NERNEY.